Patented Sept. 11, 1945

2,384,570

UNITED STATES PATENT OFFICE 2,384,570

RUBBERLIKE MULTIPOLYMERS CONTAINING A CONJUGATED DIENE HYDROCARBON

Waldo L. Semon, Silver Lake, Ohio, assignor to The B. F. Goodrich Company, New York, N. Y., a corporation of New York No Drawing. Application March 5, 1940, Serial No. 322,383

14 Claims. (Cl. 260—84.5)

This invention relates to the art of producing synthetic rubber and has as its object the preparation of new synthetic rubber-like compositions.

In evaluating a synthetic product designed as a possible substitute for natural rubber, a great many of its properties need to be considered. Thus, the material should resemble natural rubber in certain essential processing properties, namely, in ability to be masticated to a plastic condition in which it can be mixed with pigments, shaped, extruded and molded, and thereafter it should be capable of undergoing vulcanization from this plastic condition to an elastic condition in which it acquires good mechanical strength. The synthetic rubbers described in this specification are equivalent to natural rubber in regard to these properties and in addition possess attributes superior to natural rubber such as resistance to solvents, heat, light and oxidation. Such products serve not only as replacements for natural rubber but also make possible new and extremely important applications in fields where previously rubber could not be used.

Many of the synthetic rubbers which have been described in the past possess one or more of the essential and desired characteristics. Thus for example, the rubber produced by copolymerizing butadiene and acrylonitrile is much more resistant to oils and exhibits much when vulcanized higher tensile strength than does natural rubber but, on the other hand, is less plastic, can be masticated only with difficulty forming a rough sheet on a cold mill and becomes dry and crumbly on a hot mill. Similarly, other proposed synthetic rubbers although possessing some desirable properties have been found to be lacking in others.

I have now discovered a process whereby synthetic rubber-like materials possessing to a remarkable degree a proper balance between all the properties desired in a synthetic rubber may readily be prepared.

In brief, the present invention resides in the discovery that copolymers, termed herein multipolymers, prepared by the simultaneous polymerization of an aliphatic conjugated diene with at least two other polymerizable ingredients, are not only plastic and easily worked in the unvulcanized state but are also mechanically strong and chemically resistant in the vulcanized state.

In accordance with the present invention a conjugated diene of the general formula

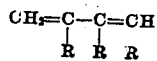

wherein each R may be hydrogen or methyl such as butadiene, isoprene, dimethyl butadiene, piperylene and the like is polymerized according to any desired method with two or more other compounds both of which are polymerizable acrylic esters or nitriles such as methyl acrylate, methyl methacrylate, butyl methacrylate, acrylonitrile, methacrylonitrile and the like.

In order to obtain rubber-like products of good quality it is necessary that the polymerizable diene be present in an amount exceeding about 50% by weight of the mixture. The proportions of the other polymerizable ingredients may be varied, however, in accordance with the properties desired in the product. For example, if an unusually oil resistant polymer is desired, it will be advantageous to employ relatively large amounts of acrylonitrile in the mixture to be polymerized.

Although a number of compounds and a wide variety of combinations may be employed to give rubber-like products, it is preferred to utilize butadiene as the polymerizable diene ingredient because of its commercial availability and the high quality of the products obtained therefrom.

It is to be understood that the valuable properties of the multipolymers of the present invention could not have been obtained by any devices known to the prior art. For example, the particularly desirable combination of plasticity and durability shown by a multipolymer of butadiene, acrylonitrile and methacrylonitrile could not be attained by mechanically mixing the individually polymerized monomers nor by mixing a dual-polymer of butadiene and acrylonitrile with a dual-polymer of butadiene and methacrylonitrile.

Any suitable method or process may be employed for effecting polymerization of the multiple ingredients. Thus, polymerization may be carried out in a homogenous system by the application of heat, actinic light or pressure to the mixture either with or without the presence of a solvent and/or a polymerization catalyst. It is at present preferred, however, to carry out the polymerization in water emulsion in the presence of an emulsifying agent and, preferably but not essentially, a polymerization catalyst. A number of emulsifying agents such as fatty acid soaps, high molecular weight aliphate sulfates or sulfonates, aromatic sulfonic acids or derivatives thereof, salts of high molecular weight organic bases, and the like may be used. A very effective emulsifying agent is that consisting of a 2–3% water emulsion of a fatty acid, such as palmitic or myristic acid, which has been 80 to 95% neutralized with alkali.

As catalysts for the emulsion polymerization, may be mentioned such compounds as hydrogen peroxide, diazoaminobenzene, dipotassium diazomethane-disulfonate, benzoyl peroxide, potassium persulfate and styrene oxide as well as other strong oxidizing agents. In the event that hydrogen peroxide is used as the polymerization catalyst, it has been found that the addition of certain other compounds greatly facilitates the polymerization. Among these compounds, which have been termed activators, are those which form complexes with hydrogen peroxide such as sodium pyrophosphate, sodium oxalate, potassium fluoride, urea, glycine, alanine and the like. Other materials known to direct the course of the polymerization or to modify the properties of the polymers obtained also may be included in the mixture to be polymerized.

Polymerization of the emulsion is preferably carried out at temperatures between 30° and 70° C. and, preferably, with continued shaking or stirring. The polymerization products are then obtained as a latex-like emulsion which can be coagulated, if desired, by the methods ordinarily used to coagulate rubber latices, for example, by freezing out, by addition of acid, alcohol, salts, or by a combination of these methods. However, before coagulation it is often desirable to add to the latex-like emulsion an antioxidant or age resistor such as phenyl beta naphthylamine to improve the aging properties of the copolymer.

The multipolymers thus prepared are easily milled, may readily be mixed with pigments, fillers, softeners, and vulcanization accelerators ordinarily used with natural rubber, and may be vulcanized in the usual manner. It is to be understood that the properties of the vulcanizates prepared from these multipolymers may be varied fully as much by compounding as in the case of natural rubber. These multipolymers are also soluble in benzene and acetone and from them rubber cements of high tack may be prepared.

The method of preparing these rubber-like materials and their properties are further illustrated by the following examples in which the parts are by weight.

Example 1

A liquid mixture consisting of 70 parts butadiene, 15 parts acrylonitrile and 15 parts methacrylonitrile is emulsified with 250 parts of a 1½% aqueous soap solution and 15 parts of a 5% aqueous solution of potassium persulfate and allowed to polymerize with continuous agitation at 40° C. for 46 hours. Then two parts of emulsified phenyl beta naphthylamine are added to the latex-like emulsion and the mixture is then coagulated by the addition of acetic acid and salt. Upon separating and drying, the coagulum is obtained as an elastic, tacky material which resembles crepe rubber. It can be milled without difficulty and becomes considerably more plastic than a copolymer obtained from butadiene and acrylonitrile alone. Compounding ingredients such as carbon black, stearic acid, sulphur and accelerator can be easily dispersed in the rubber-like product and compounds so prepared can be vulcanized to a soft elastic rubber having a tensile strength of 4700–5000 lbs./sq. in. and an ultimate elongation of 580–600%. The vulcanizates so prepared are resistant to swelling by mineral and vegetable oils and are more resistant to heat and to aging than natural rubber vulcanizates.

Example 2

| | Parts |
|---|---|
| Butadiene | 75 |
| Acrylonitrile | 15 |
| Methacrylonitrile | 10 | are emulsified in water with 250 parts of a 2% solution of palmitic acid which is 85% neutralized with alkali and in the presence of 10 parts of a 3½% hydrogen peroxide solution as polymerization catalyst. The emulsion is maintained at 40° C. for 47 hours with continued stirring, and is then coagulated as in Example 1. The coagulum is separated, washed with warm water, and dried by milling on a rubber mill, whereby there is obtained 98 parts of a plastic, rubber-like product. When compounded as in Example 1, with carbon black, stearic acid, zinc oxide, sulphur and accelerator, a high grade soft rubber is obtained exhibiting a tensile strength of 5100 lbs./sq. in. and a 550% elongation. These values are to be compared with tensile strengths of from 4000–4500 lbs./sq. in. and elongations of 500–550% obtained from butadiene-acrylonitrile dual-polymers which have been similarly prepared, compounded and vulcanized. These results are quite remarkable when it is considered that this polymer is considerably more plastic and compares favorably in oil resistance with the butadiene-acrylonitrile polymer.

Example 3

| | Parts |
|---|---|
| Butadiene | 50 |
| Acrylonitrile | 20 |
| Methyl metacrylate | 30 | are polymerized in aqueous emulsion in the presence of soap and potassium persulfate as in Example 1. After 64 hours an elastic, tacky, rubber-like multipolymer is separated from the emulsion in the usual manner. This multipolymer is thermoplastic and is readily worked on a hot rubber mill, differing in this respect from the butadiene-acrylonitrile dual-polymers. Compounds containing this synthetic rubber are also easily extruded and molded and yield, when vulcanized, resilient compositions having good resistance to solvents and to oxidation as well as possessing satisfactory mechanical properties.

Example 4

| | Parts |
|---|---|
| Butadiene | 67 |
| Acrylonitrile | 13 |
| Methyl methacrylate | 20 | are polymerized as in Example 1, yielding a soft plastic rubber-like polymer, which when compounded and vulcanized as in Example 2 gives a tensile strength of 4000 lbs./sq. in. and a 420% elongation.

Example 5

| | Parts |
|---|---|
| Butadiene | 70 |
| Methyl methacrylate | 10 |
| Acrylonitrile | 10 |
| Methacrylonitrile | 10 | are polymerized as in Example 2. A synthetic rubber-like product is again obtained which has excellent plasticity in the unvulcanized condition and which when vulcanized exhibits desirable chemical resistance and mechanical strength.

I claim:

1. The process which comprises polymerizing a mixture of polymerizable materials comprising a conjugated diolefin of the formula

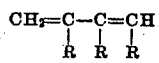

wherein each R represents a member of the class consisting of hydrogen and methyl, and at least two but not more than three polymerizable acrylic compounds selected from the class consisting of esters and nitriles of acrylic acid and methacrylic acid, said mixture containing not less than 50% by weight of the conjugated diolefin and a substantial proportion of each of the acrylic compounds.

2. Rubber-like multipolymers derived by the polymerization of mixtures of polymerizable materials comprising a conjugated diolefin of the formula

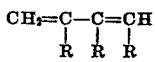

wherein each R represents a member of the class consisting of hydrogen and methyl, and at least two but not more than three polymerizable acrylic compounds selected from the class consisting of esters and nitriles of acrylic acid and methacrylic acid, said mixture containing not less than 50% by weight of the conjugated diolefin and a substantial proportion of each of the acrylic compounds.

3. The process which comprises polymerizing a mixture of polymerizable materials comprising a conjugated diolefin of the formula

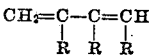

wherein each R represents a member of the class consisting of hydrogen and methyl, and from two to three polymerizable acrylic compounds selected from the class consisting of esters and nitriles of acrylic acid and methacrylic acid, the said mixture containing from 50 to 75% by weight of the said conjugated diolefin and from 25 to 50% by weight of the said acrylic compounds, each of the said acrylic compounds being present in an amount as much as about 10% by weight.

4. A rubber-like multipolymer derived by the polymerization of a mixture of polymerizable materials comprising a conjugated diolefin of the formula

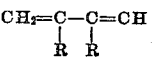

wherein R represents a member of the class consisting of hydrogen and methyl, and from two to three polymerizable acrylic compounds selected from the class consisting of esters and nitriles of acrylic acid and methacrylic acid, the said mixture containing from 50 to 75% by weight of the said conjugated diolefin and from 25 to 50% by weight of the said acrylic compounds, each of the said acrylic compounds being present in an amount as much as about 10% by weight.

5. The process which comprises polymerizing in aqueous emulsion a mixture of polymerizable materials comprising butadiene-1,3, acrylonitrile, and an ester of methacrylic acid, the said mixture containing from 50 to 75% by weight of butadiene-1,3, and from 25 to 50% by weight of acrylonitrile and an ester of methacrylic acid combined, each of which is present in an amount as much as about 10% by weight.

6. A rubber-like multipolymer derived by the polymerization in aqueous emulsion of a mixture of polymerizable materials comprising butadiene-1,3, acrylonitrile, and an ester of methacrylic acid, the said mixture containing from 50 to 75% by weight of butadiene-1,3, and from 25 to 50% by weight of acrylonitrile and an ester of methacrylic acid combined, each of which is present in an amount as much as about 10% by weight.

7. The process which comprises polymerizing in aqueous emulsion a mixture of polymerizable materials comprising butadiene-1,3, acrylonitrile, and methyl methacrylate, the said mixture containing from 50 to 75% by weight of butadiene-1,3 and from 25 to 50% by weight of acrylonitrile and methyl methacrylate combined, each of which is present in an amount as much as about 10% by weight.

8. A rubber-like multipolymer derived by the polymerization in aqueous emulsion of a mixture of polymerizable materials comprising butadiene-1,3, acrylonitrile and methyl methacrylate, the said mixture containing from 50 to 75% by weight of butadiene-1,3 and from 25 to 50% by weight of acrylonitrile and methyl methacrylate combined, each of which is present in an amount as much as about 10% by weight.

9. The process which comprises polymerizing in aqueous emulsion a mixture of polymerizable materials comprising butadiene-1,3, acrylonitrile and methacrylonitrile, the said mixture containing from 50 to 75% by weight of butadiene-1,3 and from 25 to 50% by weight of acrylonitrile and methacrylonitrile combined, each of which is present in an amount as much as about 10% by weight.

10. A rubber-like multipolymer derived by the polymerization in aqueous emulsion of a mixture of polymerizable materials comprising butadiene-1,3, acrylonitrile and methacrylonitrile, the said mixture containing from 50 to 75% by weight of butadiene-1,3 and from 25 to 50% by weight of acrylonitrile and methacrylonitrile combined, each of which is present in an amount as much as about 10% by weight.

11. A rubber-like multipolymer prepared by the polymerization in aqueous emulsion of a mixture of polymerizable materials comprising about 50% by weight of butadiene-1,3, about 20% by weight of acrylonitrile and about 30% by weight of methyl methacrylate.

12. A rubber-like multipolymer prepared by the polymerization in aqueous emulsion of a mixture of polymerizable materials comprising about 70% by weight of butadiene-1,3, about 15% by weight of acrylonitrile and about 15% by weight of methacrylonitrile.

13. A rubber-like multipolymer prepared by the polymerization in aqueous emulsion of a mixture of polymerizable materials comprising about 70% by weight of butadiene-1,3, about 10% by weight of methyl methacrylate, about 10% by weight of acrylonitrile and about 10% by weight of methacrylonitrile.

14. A rubber-like multipolymer prepared by the polymerization of a mixture of polymerizable materials comprising butadiene-1,3 and from two to three polymerizable acrylic compounds selected from the class consisting of esters and nitriles of acrylic acid and methacrylic acid, the said mixture containing as much as about 50% by weight of butadiene-1,3 and as much as about 10% by weight of each of the said acrylic compounds.

WALDO L. SEMON.